United States Patent [19]
Albertson

[11] 4,133,183
[45] Jan. 9, 1979

[54] SOLAR POWERED ABSORPTION REFRIGERATION SYSTEM

[75] Inventor: Clarence E. Albertson, Villa Park, Ill.

[73] Assignee: Borg-Warner Corporation, Chicago, Ill.

[21] Appl. No.: 755,328

[22] Filed: Dec. 29, 1976

[51] Int. Cl.² .... F25B 27/00; F25B 15/00, F24J/3/02
[52] U.S. Cl. .............................................. 62/2; 62/148; 62/476; 126/271
[58] Field of Search .................................... 62/2, 148, 62/476, 324; 126/271; 203/DIG. 1

[56] References Cited

U.S. PATENT DOCUMENTS

| | | | |
|---|---|---|---|
| 2,030,350 | 2/1936 | Bremser | 62/2 |
| 2,692,483 | 10/1954 | Hedland | 62/2 |
| 3,242,679 | 3/1966 | Puckett et al. | 62/2 |
| 3,410,104 | 11/1968 | Hopkins | 62/148 |
| 3,980,071 | 9/1976 | Barber, Jr. | 126/271 |
| 3,985,116 | 10/1976 | Kapany | 126/271 |
| 3,985,117 | 10/1976 | Sallen | 126/271 |
| 3,985,119 | 10/1976 | Oakes, Jr. | 126/271 |
| 4,028,904 | 6/1977 | Anderson | 62/2 |

Primary Examiner—Lloyd L. King
Attorney, Agent, or Firm—Thomas B. Hunter

[57] ABSTRACT

An absorption refrigeration system utilizes a solar collector in the heat input circuit and includes means within the collector housing for condensing water vapor released from the absorbent solution. Ambient air abstracts heat from the vapor and causes condensation thereof.

8 Claims, 5 Drawing Figures

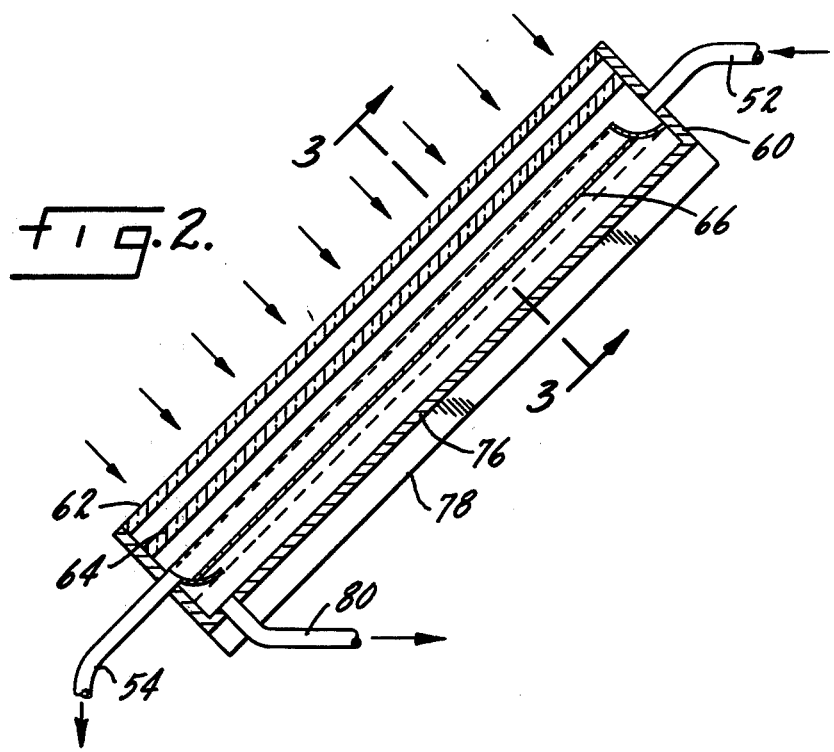
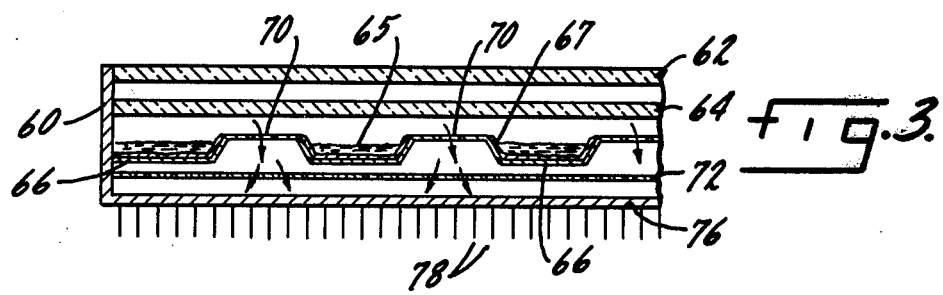
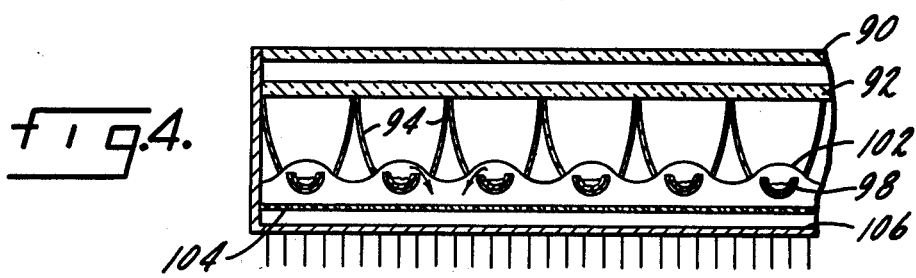
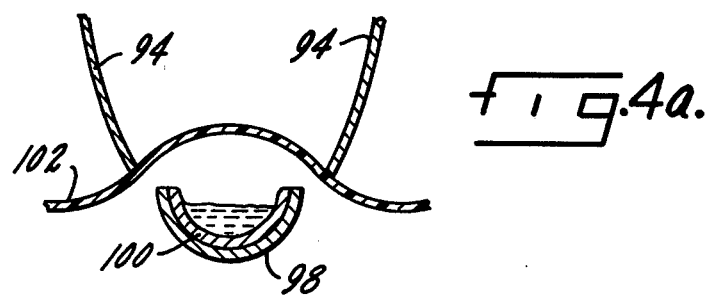

SOLAR POWERED ABSORPTION REFRIGERATION SYSTEM

BACKGROUND OF THE INVENTION

1. Field of the Invention

Absorption refrigeration apparatus utilizing solar energy as the heat input with ambient air employed as a condensing fluid.

2. Description of the Prior Art

U.S. Pat. Nos. 3,980,071; 3,985,116; 3,985,117; and 3,985,119 are representative of different types of solar collectors heretofore known in the art. None provides means for condensing vapor or suggests an application to an absorption system.

U.S. Pat. No. 3,410,104 describes the construction and operation of a typical absorption refrigeration system powered by steam, although hot water is often used as a source of heat energy to the generator.

SUMMARY OF THE INVENTION

This invention relates to absorption refrigeration means and more particularly of the type using a hygroscopic brine, such as lithium bromide, as the absorber fluid, and water as the refrigerant. The present invention uses a solar collector as the sole source of heat input to drive water vapor from the brine. The collector incorporates features which permit the vapor to be condensed in one portion thereof for circulation to the evaporator.

In a typical absorption refrigeration system, a liquid is circulated in a chilling coil forming a portion of an evaporator in which a refrigerant is vaporized to abstract heat from the liquid. The liquid thus chilled is conducted to a refrigeration load, such as one or more remotely located air-conditioning units, the vaporized refrigerant passing to an absorber for absorption by a solution having a strong affinity for the refrigerant. The absorbent solution is diluted by the absorption process, and the heat of solution thus generated is removed by circulating a cooling medium in a cooling coil provided in the absorber. The dilute solution is conducted from the absorber to a generator, where it is heated to evaporate refrigerant, thereby increasing the concentration of the solution. The concentrated solution is returned to the absorber, and the evaporated refrigerant is liquified in a condenser from which it is returned to the evaporator to complete the absorption refrigeration cycle. The evaporator and the absorber are maintained at substantially lower pressures than the generator and the condenser. Water is frequently used as the refrigerant, the chilled fluid and the cooling medium, a suitable source of heat in the generator being steam or hot water circulated in a heating coil. When the refrigerant is water, the absorbent solution is typically a hygroscopic brine such as an aqueous solution of lithium bromide or lithium chloride. It is to be noted, however, that a large number of fluids with widely varying characteristics are suitable for use in absorption refrigeration systems.

The absorber cooling coil often conveniently forms a portion of a cooling circuit which also includes a condenser coil, situated in series with the cooling coil, for abstraction heat from the refrigerant evaporated in the generator to reduce it to condensate. The cooling water is conducted from the condenser coil to a remote location where the heat abstracted in the absorber and in the condenser is rejected to ambient air, usually the air out of doors. Alternatively, and where feasible, the cooling water may be drawn from a body of water such as a lake, a stream, an artificial pool or a deep well, and returned thereto, the body of water thus forming a portion of the cooling circuit.

In contrast, the present invention utilizes a solar collector both as a means for receiving solar energy for transmission to the brine in order to heat the same to an energized temperature to drive off water vapor. In another portion of the housing, the vapor passes into contact to a surface which is maintained essentially at ambient air temperature so that the vapor is condensed and circulated to the evaporator.

DESCRIPTION OF THE DRAWINGS

FIG. 2 is a cross-section view of a preferred embodiment of the solar collector;

FIG. 3 is a partial cross-section view taken along the plane of line 3—3 of FIG. 2;

FIG. 4 is a partial cross-section view showing a modified form of the invention; and FIG. 4a shows a detail of one of the collector troughs in the FIG. 4 modification.

DESCRIPTION OF A PREFERRED EMBODIMENT

Figure 1:
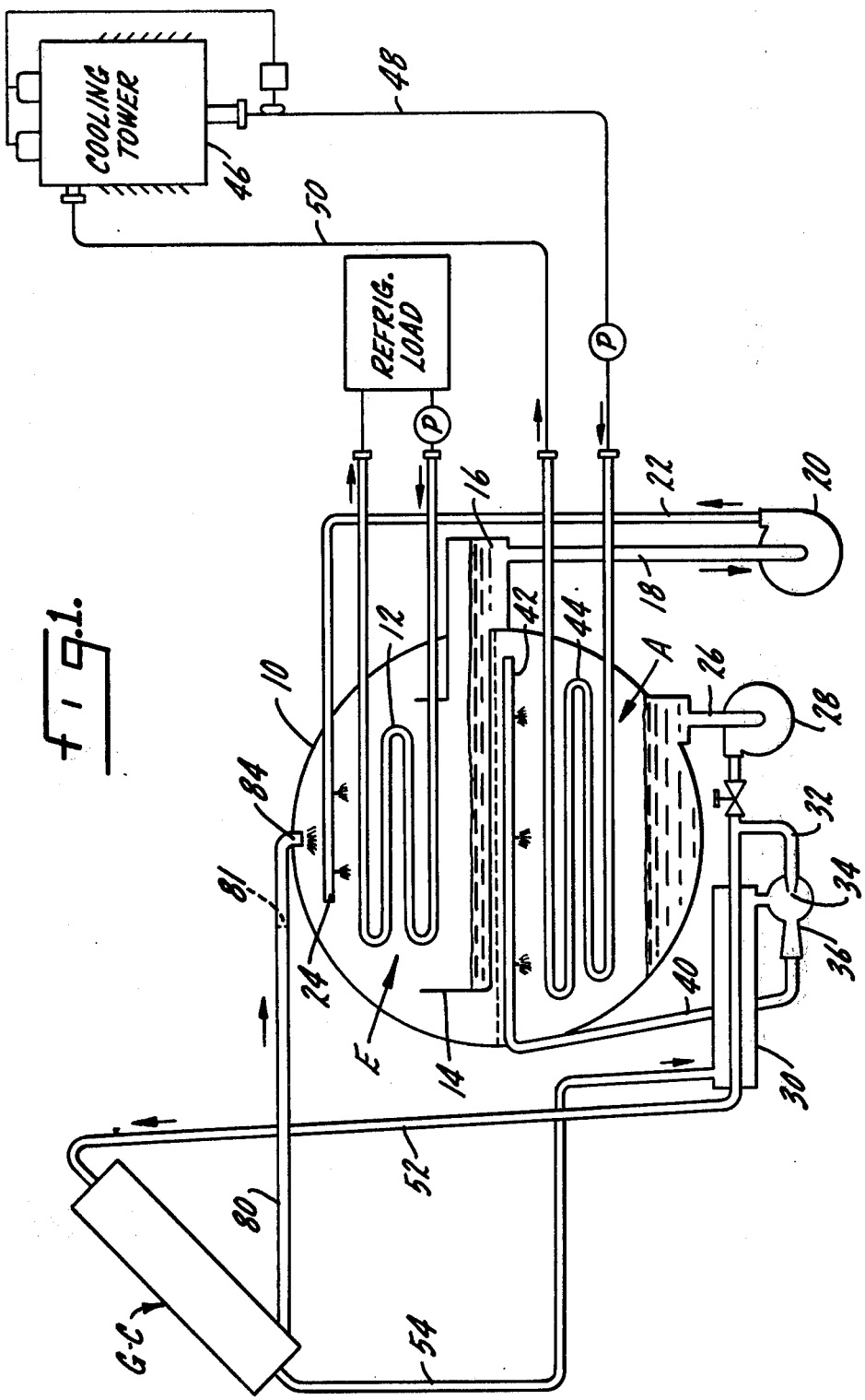
FIG. 1 is a simplified schematic diagram showing the various components in an absorption refrigeration system which is representative of the type of system for which the combined solar collector, generator/condenser of the present invention may be appropriately used.

Referring first to FIGS. 1-3, the absorption system of the present invention includes several major components including a pressure vessel or shell 10 in which is located an evaporator section E and an absorber section A. The evaporator comprises a coil 12 positioned above a pan 14 which is adapted to collect unevaporated refrigerant (water) which passes over the coil. Refrigerant is continuously circulated from an evaporator sump 16 through line 18 to the inlet of refrigerant pump 20. The pump 20 circulates refrigerant through line 22 to a spray header 24 above coil 12. The lower portion of the shell 10 forms a sump for the collection of absorbent solution which is circulated through outlet line 26 to absorber pump 28. From there is passes through a solution heat exchanger 30 where it comes into contact with concentrated absorbent solution returning from the solar collector/generator section, as will be described in more detail below. A portion of the solution leaving pump 28 is diverted through line 32 which forms an ejector nozzle 34 in ejector mechanism 36. The concentrated solution in heat exchanger 30 mixes with the solution in line 32 and the mixture is directed through line 40 to a spray header 42 above absorber coil 44. Coil 44 is supplied with a coolant which may be water from cooling tower 46 which flows through line 48 to the coil and returns through line 50 back into the cooling tower. It should be understood that any source of cooling water may be used although it is most common to use air cooled cooling towers in absorption systems of this type.

In the operation of the absorber section, the "thirsty" brine absorbs the water vapor released in the evaporator section and combines therewith to create a more diluent solution which is removed from the absorber section through line 26 and pump 28. A portion of the diluent solution is fed through the solution heat exchanger 30 and then through line 52 to the inlet end of the generator/condenser GC. The concentrated solution from the generator section returns to the solution heat exchanger 30 through line 54.

FIG. 2 is a cross-section view of the collector which includes a housing 60 of generally rectangular form which has a pair of spaced glass or other type of radiation transparent panels 62, 64. A series of troughs 66 (see FIG. 3) extend at an inclined angle, as oriented in the collector, and the solution 65 flows downwardly through the troughs toward the solution return line 54 at the outlet end of the collector housing. Each of the troughs 66 is coated, at 67, with a heat absorbent coating such as black nickel or the like. As the solution flows from the inlet to the outlet end of the collector, a considerable amount of water vapor is released. This vapor flows through openings or spaces 70 between the troughs and then passes through a partition 72 which has its upper surface coated or otherwise provided with a reflective material to direct the heat upwardly against the bottom of the troughs.

The partition 72 has a series of perforations which allow the water vapor to pass through in order to come into contact with the lower wall 76 of the housing. The vapor, when it contacts wall 76, condenses because of the heat transfer augmentation provided by fins 78 extending outwardly from the other side of wall 76 into the ambient air. The condensed refrigerant then flows to an outlet line 80, containing an orifice 81, leading to a distributor box or nozzle 84 above the refrigerant distributor header 24 in evaporator E.

FIGS. 4 and 4a illustrate another modification of the collector. In this embodiment, two panels of glass or other radiation transparent material, shown at 90 or 92, are disposed above a series of parabolic elements 94 which are spaced along the wall of the collector housing and tend to concentrate the radiation into a series of troughs 98, which in a manner similar to the FIG. 3 embodiment, conduct the relatively dilute absorbent solution from the entrance end of the collector assembly to the outlet end thereof. Each of the collector troughs has a heat absorbing surface 100 coated or otherwise formed on the inside thereof so as to readily absorb radiant energy striking the surface and transfer it to the solution in the trough. A piece of transparent film 102 extends above the trough and underneath the parabolic elements 74. This film, which may be made of Tedlar, or other transparent, chemically inert material, forms a barrier to water vapor released from the solution as it flows down through the trough elements. The vapor flows down between the troughs and then through a perforated partition 104. Like panel 72, it has a reflective upper surface and sufficient openings to permit the vapor to flow through the partition causing it to strike the inside surface of the lower wall 106 to condense the vapor in the same manner as the FIG. 2 embodiment.

While this invention has been described in connection with certain specific embodiments thereof, it is to be understood that this is by way of illustration and not by way of limitation; and the scope of the appended claims should be construed as broadly as the prior art will permit.

What is claimed is:

1. An absorption refrigeration system comprising: an evaporator; an absorber; a generator and a condenser all connected in a closed, continuous cycle refrigeration circuit with relatively concentrated absorbent solution flowing to the absorber to absorb water vapor from the evaporator and relatively dilute absorbent solution flowing from the absorber to the generator to be concentrated with concomitant release of water vapor to be conducted to the condenser, said generator and condenser being combined in a housing which includes a solar collector for providing thermal energy to the absorbent solution to be concentrated, said solar collector including a series of inclined troughs into which said relatively dilute solution is introduced, said troughs being provided with a solar absorbing surface; an air-cooled condenser section in said housing including means defining a vapor condensing surface subjacent said troughs; and means for conducting condensed vapor to said evaporator.

2. A system as defined in claim 1 including a foraminous panel interposed between said condensing surface and said troughs, the surface of said panel facing said troughs being provided with a reflective finish to direct solar radiation away from said condensing surface.

3. A system as defined in claim 2 including at least one solar radiation transparent panel above said troughs to close the upper portion of said housing.

4. A system as defined in claim 3 including heat transfer augmentation means in thermally conductive relation with said condensing surface and extending into the ambient atmosphere.

5. A combination generator and condenser for an absorption refrigerant system of the type including an evaporator and an absorber comprising: a housing including a solar collector for providing thermal energy to the absorbent solution to be concentrated; an air-cooled condenser section in said housing; a series of inclined troughs to which relatively dilute solution from said absorber is introduced, said troughs being provided with a solar heat absorbing surface; means defining a vapor condensing surface in said housing subjacent said troughs; and means for conducting condensate vapor to said evaporator.

6. Apparatus as defined in claim 5 including a foraminous panel interposed between said condensing surface and said troughs, the surface of said panel facing said troughs being provided with a reflective finish to direct solar radiation away from said condensing surface.

7. Apparatus as defined in claim 6 including at least one solar radiation transparent panel above said troughs to close the upper portion of said housing.

8. Apparatus as defined in claim 7 including heat transfer augmentation means in thermally conductive relation with said condensing surface and extending into the ambient atmosphere.

* * * * *